Dec. 2, 1958 R. K. ROBERTSON 2,862,758
CAMPING EQUIPMENT TRAILERS
Filed June 22, 1954 5 Sheets-Sheet 1

INVENTOR.
RUTH KING ROBERTSON
BY
Reynolds, Beach & Christman
ATTORNEYS

INVENTOR.
RUTH KING ROBERTSON
BY
Reynolds, Beach & Christensen
ATTORNEYS

Dec. 2, 1958   R. K. ROBERTSON   2,862,758
CAMPING EQUIPMENT TRAILERS

Filed June 22, 1954   5 Sheets-Sheet 4

INVENTOR.
RUTH KING ROBERTSON
BY
Reynolds, Beach & Christensen
ATTORNEYS

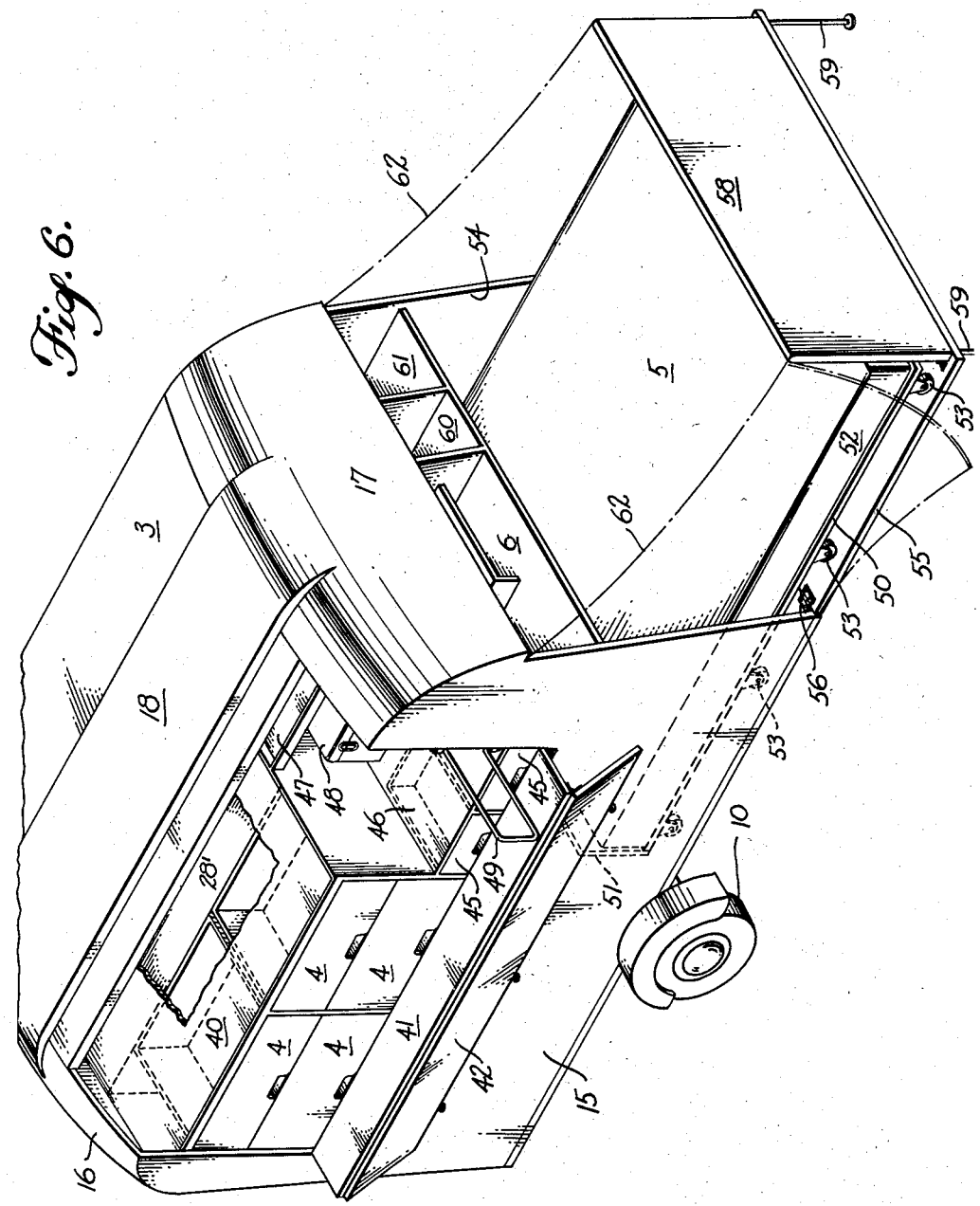

United States Patent Office 2,862,758
Patented Dec. 2, 1958

2,862,758

CAMPING EQUIPMENT TRAILERS

Ruth King Robertson, near Port Blakely, Wash.

Application June 22, 1954, Serial No. 438,565

5 Claims. (Cl. 296—23)

The present invention relates to a trailer to be drawn by an automotive vehicle such as an automobile or a truck but is outfitted with camping equipment as distinguished from a luggage or utility trailer in which baggage, camping equipment or other items can be hauled, on the one hand, and a house trailer, on the other hand, providing shelter and living space within its confines.

The principal object of the present trailer is to provide living equipment in an arrangement readily accessible and quickly available for use without the trailer being as large and heavy as a house type of trailer outfitted with comparable quantity and kind of equipment. More specifically, it is an object to provide a compact trailer housing such living equipment which is accessible from the outside of the trailer rather than from the inside and arranged so that much of such equipment can be used in place.

In carrying out the aforementioned principal object it is a more particular object to provide a trailer having an upper portion at approximately working height, divided longitudinally into approximately equal opposite side portions, one side of which will house kitchen utility equipment and the other side of which is compartmented for convenient storage. Thus the kitchen compartment may be equipped with a stove, a sink, and shelves for pots, pans and kitchen supplies. The opposite compartment may be equipped with cupboards and drawers for storage of clothing and other supplies. Beneath these compartments opening at the sides of the trailer's upper portion, is a bed receiving compartment extending virtually the full width of the trailer and which houses a bed which can be withdrawn partially from its compartment for use.

A further object is to construct the compartments so that they can be opened quickly for access to them and closed again, and when closed will cover the compartments tightly and with rigid walls. An incidental object is to construct at least certain walls of the compartments so that when opened they may form surfaces supported horizontally so that they may be used for work surfaces.

Another object of the present invention is to enable areas of the trailer exposed by opening of movable walls to be covered by flexible sheet covers such as of canvas.

Additional features and objects of the invention will be pointed out in the following specific description of the preferred form of trailer shown in the drawings. In essence, however, such trailer may be considered to be composed of a lower portion having one end which can be opened for access to a bed and arranged to be supported in horizontal position to serve as a support for a bed normally stored in such lower portion of the trailer and capable of being withdrawn from such end. The other end of the trailer's lower portion may be opened to afford access to storage space. The trailer also includes an upper portion divided longitudinally into two compartments, each of which can be opened at the side and preferably also at the top of the trailer, one of such upper compartments being outfitted with kitchen equipment and the other upper compartment having convenient shelves and drawers for storage.

Figure 6 is a top perspective view of the trailer viewing the rearward port corner, showing the upper port compartment open, the upper starboard compartment closed, the front of the lower compartment closed, and the rear of the lower compartment open, parts being broken away and the bed being shown in partially extracted position.

Figure 1:
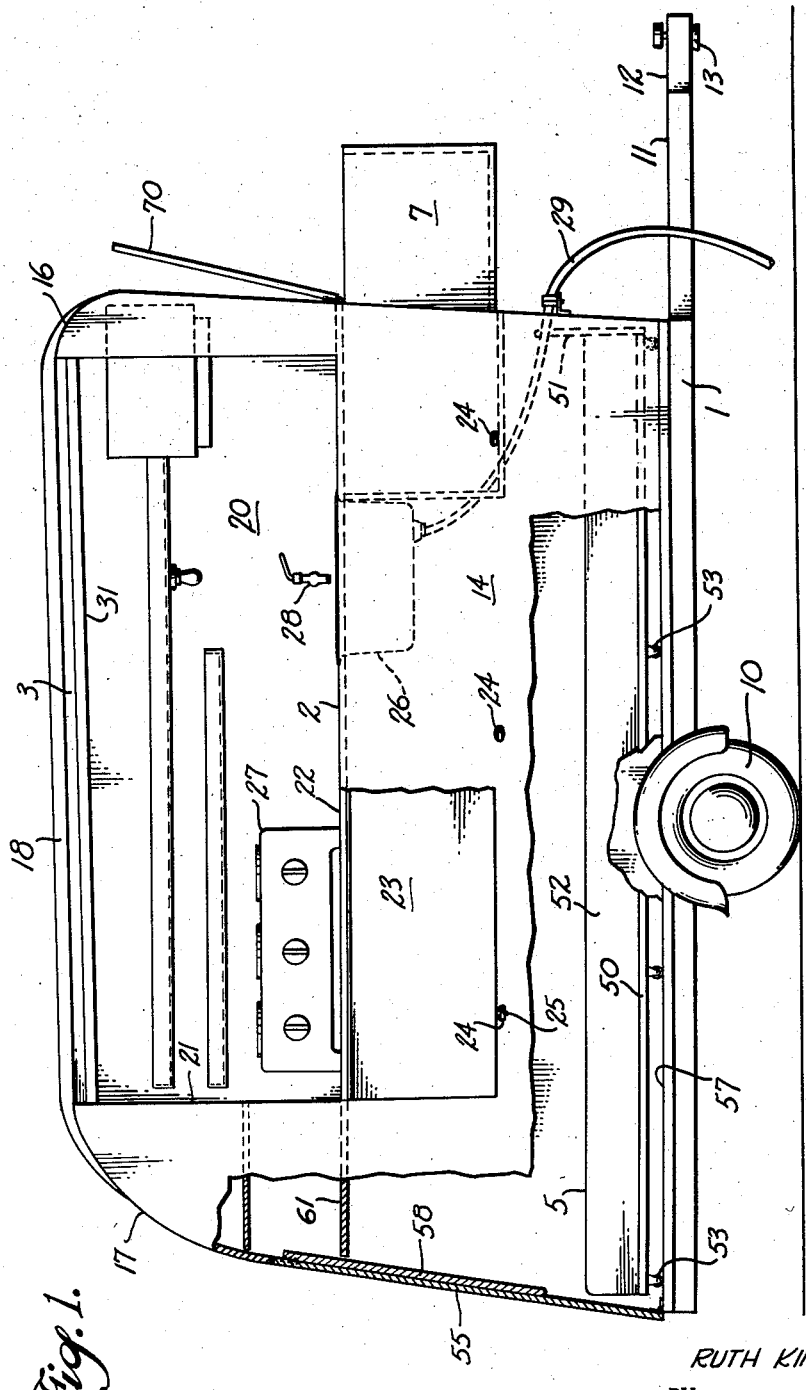
Figure 1 is a starboard side elevation view of the trailer with its starboard upper compartment open, parts being broken away.

Luggage or utility trailers are not convenient for camping purposes, because in order to use the equipment carried by them it is necessary to remove the equipment from such a trailer and to set it up independently of the trailer. Almost invariably this procedure applies to sleeping tents, tables, cookstoves and baggage. As a result it is difficult to protect such items from the weather, and they are apt to become strewn about and hard to find when needed. The principal difficulty is that not only must all the equipment be hauled out and set up, but after it has been used it must all be repacked and placed again in the trailer. Moreover, such trailers ordinarily are not covered, so that the further problem of protecting the luggage and equipment from inclement weather is presented.

House trailers have become much more popular because in them kitchen, sleeping, living and storage facilities are provided which are immediately available for use without appreciable unpacking or setting up being required. The principal disadvantage of a house trailer, however, is that the living space within it is small and movements are therefore cramped, particularly if more than one person at a time is working, and even the smallest trailers are heavy and bulky with large wind resistance and high centers of gravity, as compared with luggage trailers. Attempts have been made in the past to incorporate in a single trailer advantages of both luggage trailers and house trailers without their attendant disadvantages by making the walls of a house-type trailer expandable in one way or another. Such trailers, however, have the disadvantage that considerable time is required to expand them and collapse them, and if in their expanded condition all the walls are solid, they are still heavy. In such trailers also difficulty usually is experienced with arranging door and window access to the interior of the trailer, and joints are provided which are difficult to seal from the wind and rain.

Most of the advantages of the house-type trailer are afforded by trailers incorporating the present invention in that kitchen and storage facilities are always set up and readily accessible for convenient use. Also sleeping accommodations are made up and readily available for use. A disadvantage is that permanently covered living space is not provided, but this advantage of house trailers is largely balanced by the entire freedom of movement afforded while doing kitchen work or in placing articles in or removing them from organized storage facilities in the trailer of the present invention. Furthermore, the cost of constructing this type of trailer is much less than that of constructing a house-type trailer having comparable kitchen, sleeping and storage facilities.

A trailer incorporating the principles of the present invention may be made larger or smaller, but since it will always be smaller than a house trailer having comparable facilities, a trailer of the two-wheeled type as illustrated in the drawings almost invariably will be large enough. The body may be supported on any suitable chassis 1 sprung from an axle mounted on wheels 10. The chassis may have a convergent front frame portion 11 carrying the tongue 12 provided with a conventional trailer hitch 13. On the chassis 1 is mounted the body having a starboard side wall 14, a port side wall 15, a front wall 16, a rear wall 17 and a roof panel 18 spanning between the front wall 16 and the rear wall 17. The particular physical structure of these walls in the present invention is immaterial, but details of the arrangement of openings in such walls as they pertain to the present invention will be discussed in connection with the following more specific description of various inventive features of the trailer.

In accordance with the present invention the trailer body is divided into three major compartments and two minor compartments. The major compartments house, respectively, kitchen facilities, principal organized storage facilities and sleeping accommodations, and the minor compartments afford additional storage facilities. The first of these major compartments, which is the upper starboard compartment, shown in Figures 1 and 5, has been selected as the kitchen compartment. The bottom 2 of this kitchen compartment forms a portion of the ceiling of a lower compartment, and the wall 20 extending upward from the bottom 2 and disposed in a plane extending longitudinally of the trailer forms the division wall between the two upper major compartments. Consequently it is preferred that this upright wall be located approximately centrally of the trailer.

The trailer is designed so that, taking into consideration the size of the wheels, depth of the lower compartment, and the thickness of the frame, the bottom 2 of the kitchen compartment will be approximately kitchen counter height above the ground, on which the wheels 10 rest, that is, thirty-six to forty inches. The bottom of the kitchen compartment is then made readily accessible to a person standing on the ground by providing an opening 21 in the starboard side of the trailer extending over the major portion of its length. This opening may be closed by a wall panel which, as shown best in Figure 5, preferably is composed of two sections hinged together along a horizontal joint. The lower of these sections 22 is connected by hinges along its lower edge to the lower portion of the starboard trailer wall, so that when the closure is swung downward the section 22 may lie in a horizontal plane substantially coplanar with the floor 2 of the kitchen compartment to form an extension shelf. The upper or outer edge of this section can be supported by the upper section 23 of the closure, which has pins 24 spaced along its edge engageable respectively in eyes 25 projecting from the starboard wall of the trailer, serving as sockets for the pins. The section 23 then serves as a supporting angle brace for the outer edge of the shelf panel 22.

The kitchen compartment is outfitted with the usual facilities of a kitchen including a sink 26, the rim of which is flush with the bottom 2 of the compartment, forming a work counter, and a stove 27 which may be of the oil or gas type and have any number of heating elements. An oven also may be provided, if desired. Conveniently, the sink may be supplied with water by a faucet 28, to which water flows from a supply tank 28′ in the other side of the trailer, at a level higher than the sink and having a filling pipe 28″. Water may be drained from the sink through a hose 29 discharging onto the ground as shown in Figure 1. Suitable hangers, racks and shelves also are included, principally behind the work counter space for storage of pots and pans, dishes, silverware, and food supplies.

Figure 5:
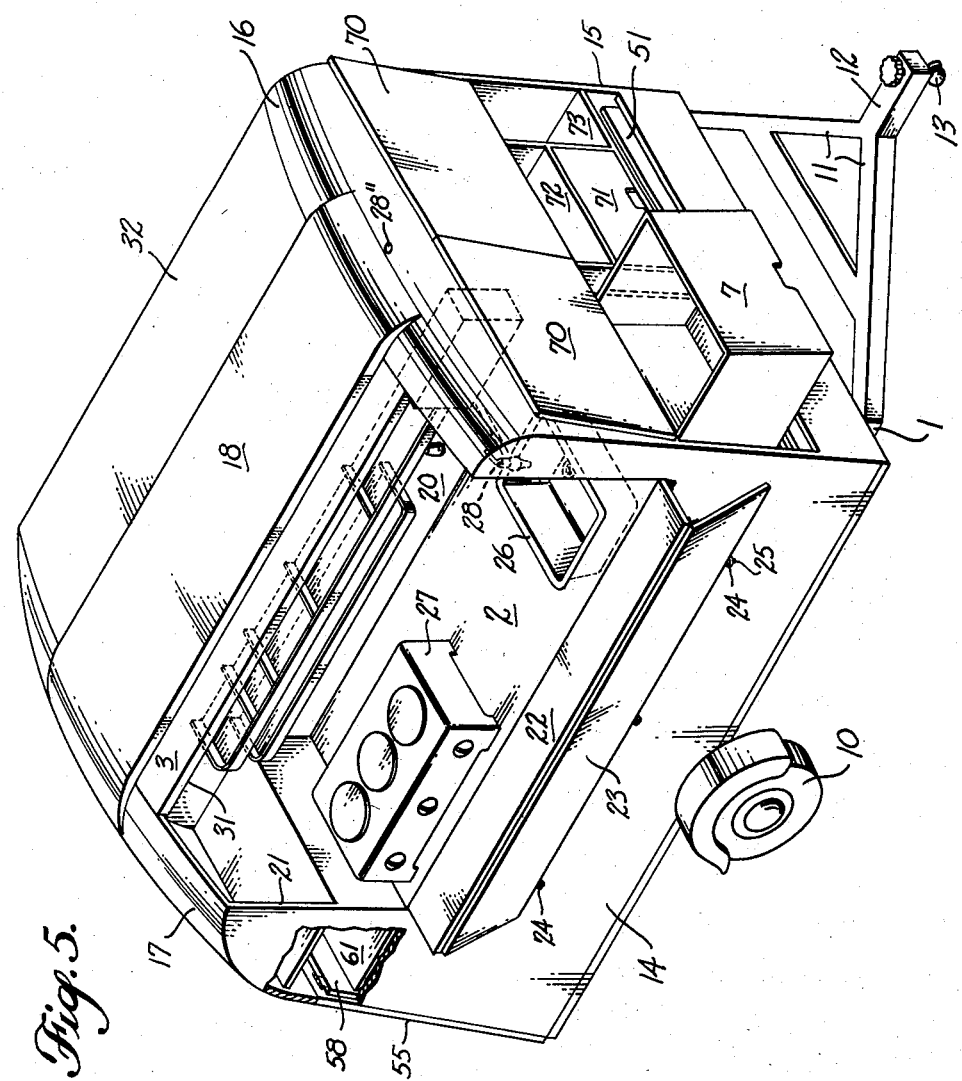
Figure 5 is a top perspective view of the trailer taken from the starboard side viewing the forward starboard corner with the starboard upper compartment open, the port upper compartment closed, the front of the lower compartment open and the rear of the lower compartment closed.

It will be evident that the various kitchen facilities mentioned will be at a convenient height for use of them by a person standing on the ground outside the trailer by its starboard side when the closure panels 22 and 23 are in their lowered positions shown in Figures 1 and 5. There is no need for the body of the trailer to be high enough to accommodate a person standing in it, and, in fact, it is preferred that the height of the trailer body be not appreciably more than four feet high. The trailer, therefore, will not be much, if any, higher than the automobile towing it. The floor of the kitchen compartment will be approximately midway between the bottom and the top of the trailer. Because the kitchen compartment will not be more than about two feet high and may be somewhat less, it is preferred that the top of the kitchen compartment be retractable, at least to some extent.

As mentioned above, the front wall 16 and the rear wall 17 of the trailer are interconnected by a roof panel 18. Such panel should be of sufficient width to brace adequately the upper portions of the end walls and of the upright dividing wall 20. The end of this panel may be faired smoothly into the walls 16 and 17, as shown in Figure 5. Between the edges of panel 18 nearer the starboard wall 14 and such wall the kitchen compartment may be covered by a roof panel 3. While this panel could be hinged along its edge to the roof panel 18 to fold back over it, a more watertight construction is afforded by providing guideways in which the panel 3 may slide from a position covering the kitchen compartment into a retracted position disposed largely beneath the fixed roof panel 18, as indicated in Figure 4.

The inner edge of panel 3 may have an upwardly extending flange 30 which will engage a downturned flange of panel 18 to serve as a stop limiting outward sliding of the panel 3, the interengaged flanges forming a watertight joint. The outer edge of this panel may have a downturned flange arranged to hook over the upper edge of the wall panel 23 when it is in its upright closing position shown in Figure 4. The pins 24 on this edge of the panel 23 may be engaged behind the flange 31 mutually to hold the roof panel 3 in its extended position and the closure panels 22, 23 in their upright positions, to close the kitchen compartment.

The second major compartment is the general storage compartment which has been selected as the upper port compartment. This compartment is outfitted with organized storage facilities, as shown best in Figures 2 and 6. In this instance the floor supporting the storage facilities is obscured by such facilities, including both drawers and shelves. Thus drawers 4 are shown grouped to form a chest arrangement above which is the shelf 40. The water tank 28′ is located behind these drawers and beneath the shelf. Such a drawer and shelf arrangement may be utilized as a bedroom dresser, because the shelf 40 is readily visible by a person of average height standing on the ground by the port side of the trailer, as indicated in Figure 4, although the shelf will be somewhat higher than a dresser top would be. Also, the drawers 4 are low enough so that when they are pulled out a person standing in that position can look downward into them easily.

Figure 4:
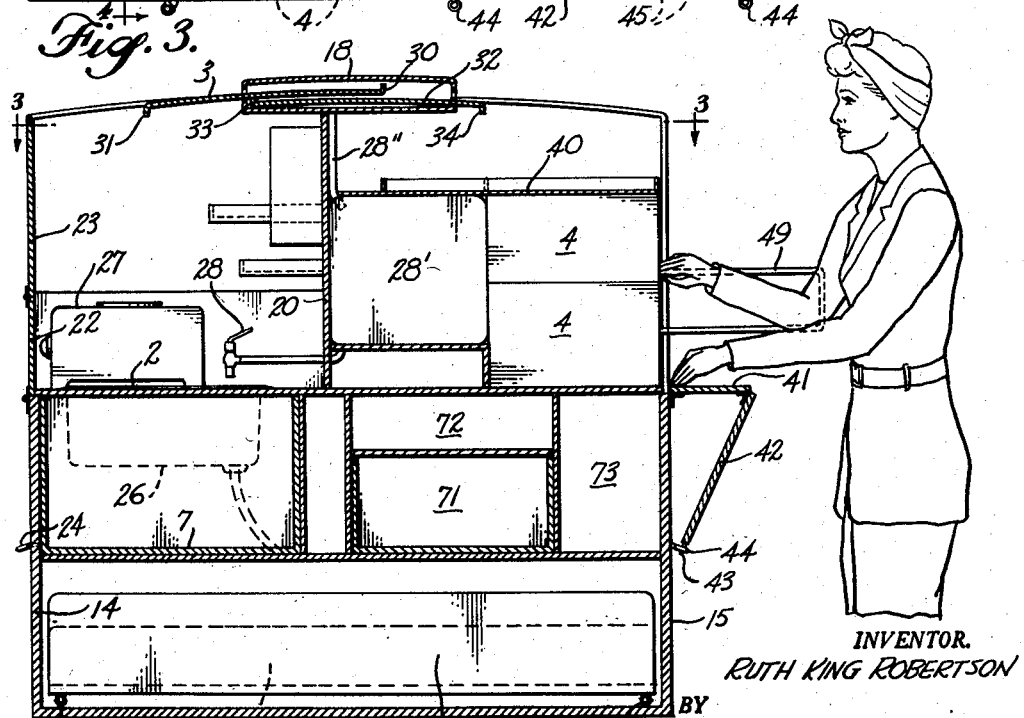
Figure 4 is a transverse vertical section taken through the trailer on line 4—4 of Figure 3.

In addition, the side closure for the storage compartment is composed of the lower panel 41 and the upper panel 42, hinged together like the closure for the kitchen compartment, which in their lowered positions of Figure 4 provide a shelf and shelf support at a lower level generally comparable to dresser height. The brace panel 42 has pins 43 carried by its edge which are engageable in eyes 44 to support the outer edge of shelf 41.

Figure 2:
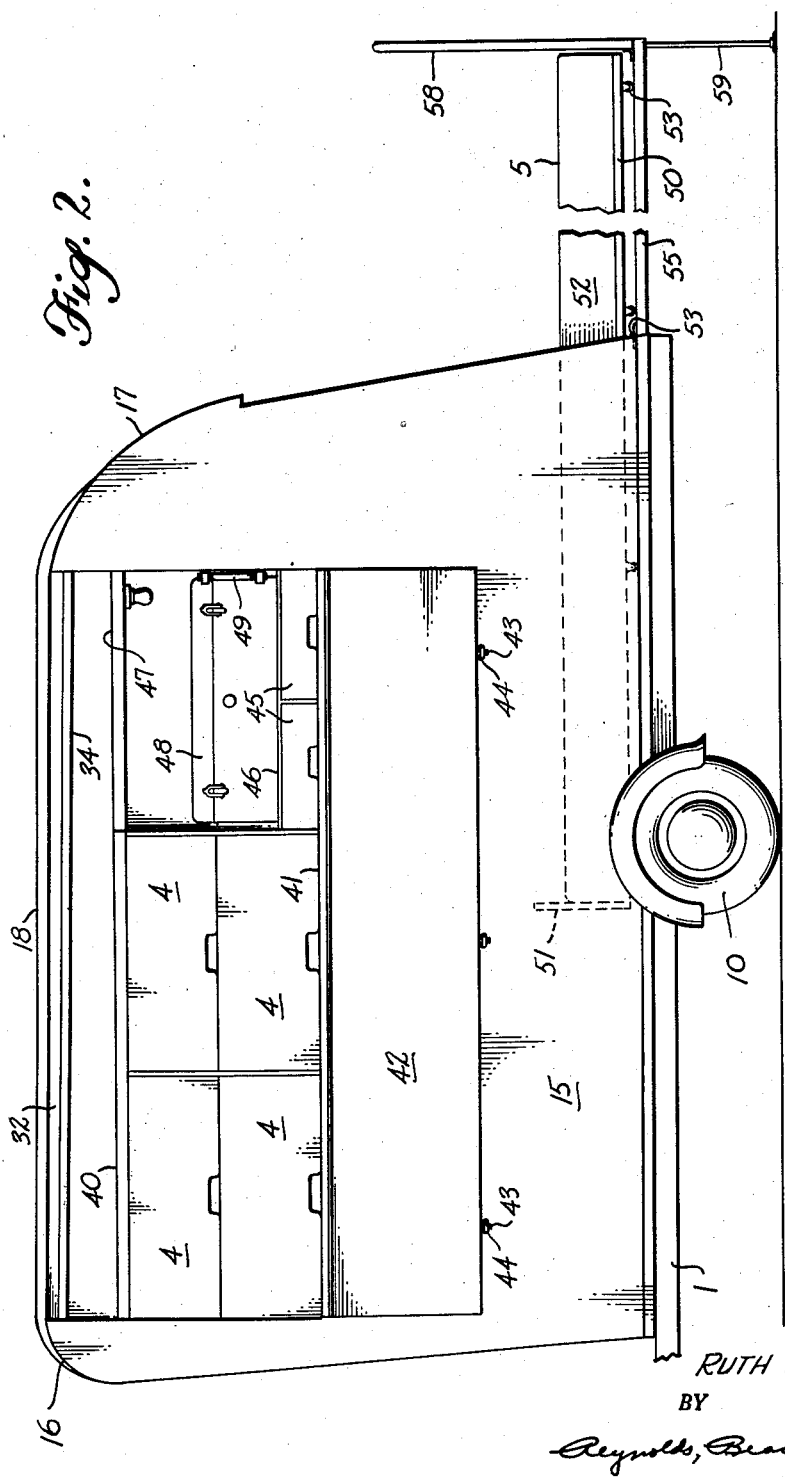
Figure 2 is a port side elevation view with the port upper compartment open and with the rearward end of the lower compartment open and the bed moved into partly extracted position.
Figure 3:
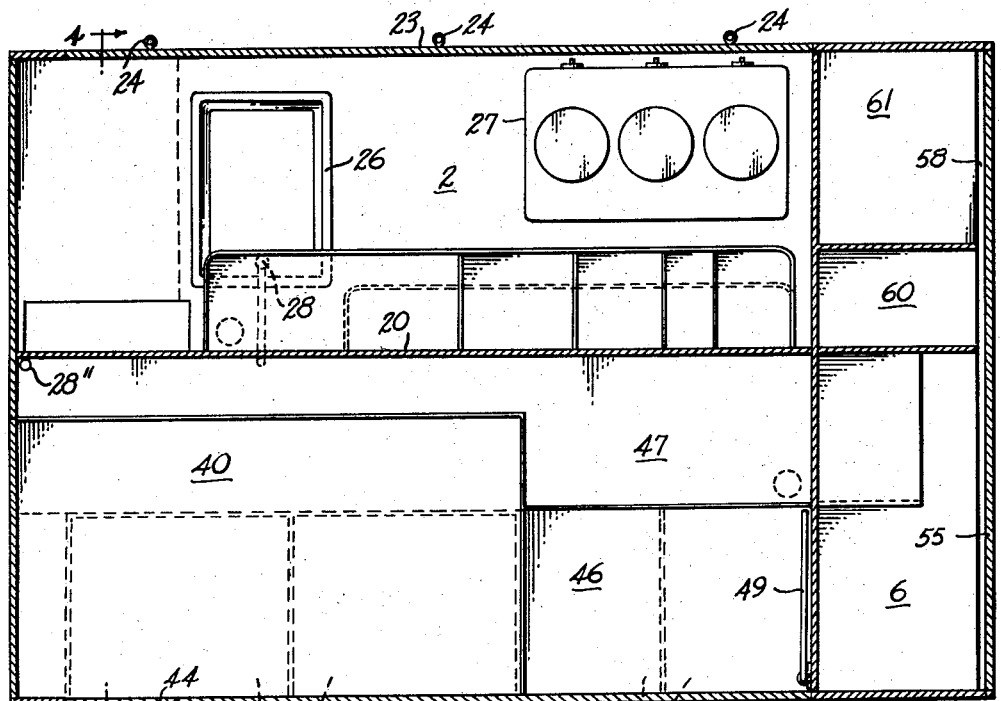
Figure 3 is a horizontal sectional view through the trailer taken on line 3—3 of Figure 4.

Although the arrangement of drawers and shelves in the main storage compartment may be varied considerably, it is preferred that in addition to drawers 4 smaller drawers such as drawers 45 shown in Figures 2 and 6 be provided, above which is the shelf 46. An upper shelf 47 may also be provided if desired. These shelves may be proportioned to accommodate camping paraphernalia of more or less standard size in various instances, such as a fishing tackle box 48. A rack 49 swingable about a vertical axis between the projected position shown in Figures 4 and 6 and a retracted position swung into the trailer, as shown in Figure 3, may be provided, on which to hang towels, clothes, or other articles as may be desired.

The opening in the vertical port wall 15 will be closed by swinging panels 41 and 42 upward from the positions shown in Figures 2, 4 and 6 into upright position. As in the case of the kitchen compartment, easier access may be afforded to the storage compartment by providing a retractible roof panel 32 which can slide inward beneath the stationary roof panel 18 into the position shown in Figure 4. This movable roof panel has an upturned flange 33 on its inner edge to engage the downturned edge of roof panel 18 nearer the port side. The outer edge of panel 32 has the downturned flange 34 which can engage over the pins 43 when the panels 42 and 41 are in upright position, both to hold such panels upright and to maintain the roof panel 33 in position covering the storage compartment.

The third major compartment is located beneath the upper starboard and port compartments described, and preferably occupies approximately the lower half of the trailer. This compartment extends the full width of the trailer between the starboard wall 14 and the port wall 15 which should be about four feet apart. A compartment of this width, as shown in Figures 4 and 6, will accommodate a bed 5 of a width sufficient for two people. This bed, which may include a flat spring 50, a low headboard 51 and a mattress 52, is supported on rollers 53 so that it may be moved lengthwise of the compartment readily. The length of the lower portion of the trailer should be between six and one half and seven feet as a minimum so that the lower compartment will be long enough to accommodate a full-length bed without contraction in any way.

The maximum depth of the major lower compartment is approximately two feet or a little more, so that while there is adequate depth for the bed it is preferred that more head room be available for sleeping than would be provided by the lower compartment. Access to the lower compartment is therefore provided through the rear wall of the trailer having an opening 54 which extends the full width of the trailer and can be closed by a large panel 55. The lower edge of this panel is supported by hinges 56 from the bottom 57 of the lower compartment so that when the panel 55 is swung from the position shown in Figure 1 downward into the position shown in Figure 6, it is disposed approximately coplanar with the floor 57.

A further panel 58 may have one edge hinged to the upper edge of the panel 55 so that when the latter panel is closed, the panel 58 will lie in face-to-face contact with it as shown in Figure 1. When the closure panel is swung downward, however, the panel 58 may be swung upward into the position shown in Figure 6 to form a relatively high headboard 58 extending upright from the rearward edge of the panel 55. Such rearward panel edge may be supported from the ground by legs 59 to maintain the panel substantially horizontal and coplanar with the floor 57 of the lower compartment. These legs 59 may, if desired, be adjustable in length in order to level the panel 55 when the trailer is on uneven ground.

The panel 55 should be three feet or so wide so that the bed 5 may be rolled approximately half way onto it from the lower compartment, as shown in Figure 6. In this position the upper portions of the bodies of persons occupying the bed will have adequate room for complete freedom of movement, and are in the open air, as in camping, in contrast to sleeping in an enclosure as in a house trailer. The height of the lower compartment is ample for the feet and legs. The footboard 51 will prevent the mattress from sliding off the springs as the bed is rolled out onto the panel 55, and the headboard 58 will limit outward movement of the bed. With the bed in such an extracted position it will also be quite easy to make the bed, so that this arrangement has all the advantages of a house trailer as far as having a set-up bed is concerned, because it need not be unfolded or remade before use.

To afford privacy while sleeping and dressing, a minor storage compartment may be provided in the rearward end of the trailer above the lower compartment, consisting of a shelf space 6 in which can be stored a tarpaulin, collapsible tent poles and mosquito netting for covering the space between the back of the trailer and the headboard 58. The outlines of a tarpaulin or mosquito netting when erected are indicated in phantom at 62 in Figure 6. The tarpaulin or mosquito netting or both may include side flaps which may extend down to cover the sides of the space between the trailer walls and the headboard ends. Additional shelves 60 and 61 will accommodate clothing, flashlights and other articles.

At its forward end the height of the lower compartment need not be appreciably greater than the thickness of the bed and the height of the headboard 51. Space is therefore afforded for a second minor storage compartment opening from the front of the trailer, as shown best in Figures 1 and 5. Preferably such minor storage compartment includes, at the side adjacent to the kitchen compartment shown on the starboard side of the trailer, a food storage drawer 7 which may be slid forward for easy access. This drawer may be refrigerated, may constitute an ice chest, or may be a cooler, if desired. When in retracted position the opening through which this drawer may be moved is closed by a door 70 preferably hinged at its upper edge.

At the other side of the forward storage space an additional drawer 71 and shelves 72 and 73 may be provided as desired. In these compartments, or in the main storage compartment, provision may be made for storing a folding table, folding chairs or stools, an axe, a shovel, and other desirable items of equipment for camping. It will be appreciated that some of the various storage compartments may be arranged and proportioned to house particular types of equipment, and such equipment may be furnished with the trailer as accessories.

In addition, if desired, sockets may be provided in the trailer to receive short tent poles which, in conjunction with other tent poles to be placed at opposite sides of the trailer, may serve to support a tent or tarpaulin covering the entire trailer for protection during use of its facilities in rainy weather. Frequently, however, it will not be necessary to provide such a complete covering.

It will be appreciated that a trailer of the type described may be opened for access to its various facilities almost as readily as the door of a house trailer can be opened for entrance to it. Such facilities will then be ready for immediate use. Also, when the trailer is closed, its contents will be just as secure and protected from the weather as completely as they would be if housed within a house trailer. Suitable locks may, of course, be provided for the various closures discussed, as may be desired. Most of the advantages of a house trailer are therefore incorporated in a trailer utilizing the principles of the present invention, which is much lighter, more compact, smaller and less expensive.

I claim as my invention:

1. A camping trailer comprising a body including a bottom, opposite sides and a roof, each of said body sides having therein an opening, openable closure means fitting said body side openings for closing the same, and upright partition means extending fore and aft, disposed between said opposite sides and defining compartments at opposite sides of said partition in registry with said opposite side body openings, respectively, and accessible from outside said body through said body side openings when said closure means are open, said roof including a central longitudinal stationary panel overlying said upright partition means and having openings at opposite sides of said stationary panel substantially in registry lengthwise of the trailer with the respective openings in said trailer sides and roof closure panels slidable edgewise away from positions adjacent to said respective body sides and closing such respective roof openings and toward said upright partition means into positions beneath said stationary panel for opening, respectively, said openings in said roof.

2. A camping equipment trailer comprising a body including a bottom, opposite sides and a roof and having a bed-housing compartment at the level of said bottom, a rear closure panel for said body hingedly connected at its lower edge to said bottom and swingable from upright position downward into a lowered position in substantially coplanar relationship with said bottom, a bed in condition for sleeping slidable from a position on said bottom in said bed-housing compartment outward into a partially extracted position overlying and partially supported by said closure panel in lowered position, and a headboard hingedly connected to the swinging edge portion of said closure panel for movement between a stored position folded alongside said closure panel and an operative position extending edgewise upwardly from such swinging edge portion of said closure panel when the closure panel is in its lowered position.

3. A camping equipment trailer comprising a body including a bottom, opposite sides and a roof, partition means within said body of generally inverted T-shaped cross section including a generally horizontal partition spaced above said bottom and forming a bed-housing compartment therebeneath opening endwise of the trailer, a rear closure panel for said bed-housing compartment opening having its lower edge hingedly connected to said bottom and of a vertical width considerably exceeding the spacing between said body bottom and said generally horizontal partition, swingable downward in extension of said body bottom, a bed slidable from a position on said body bottom in said bed-housing compartment outward into a partially extracted position overlying and partially supported by said closure panel in lowered position, and said partition means further including an upright partition above said generally horizontal partition, extending lengthwise of said body generally centrally between its opposite sides and dividing said body into a kitchen compartment and a storage compartment above said bed-housing compartment opening, respectively, through said opposite sides of said trailer body.

4. A camping equipment trailer comprising a body including a bottom, opposite sides and a roof and having a kitchen compartment therein extending over the major portion of the length of said body, one of said body sides having therein an opening extending over the major portion of the length of said body and affording access therethrough from outside the body to such kitchen compartment, openable closure means fitting said body side opening for closing the same, said roof having an opening substantially in registry lengthwise of the trailer with such opening in the body side, roof closure means extending over the major portion of the length of said body, and means guiding said roof closure means for movement away from a first position adjacent to such one body side and closing such roof opening, covering at least a portion of such kitchen compartment, and toward the opposite side of said body into open position substantially out of vertical overlapping relationship with such first position and uncovering such portion of the kitchen compartment covered thereby in its closed position.

5. A camping equipment trailer comprising a body including a bottom, opposite sides and a roof, each of said body sides having therein an opening, openable closure means fitting said body side openings for closing the same, upright partition means extending lengthwise of said body, disposed generally midway between said opposite sides and defining from said upright partition to said opposite body sides, respectively, a kitchen compartment and a storage compartment in registry with said opposite body side openings, respectively, and accessible from outside said body through said body side openings, respectively, when said closure means are open, said roof having openings in opposite edge portions thereof substantially in registry lengthwise of said body with the respective openings in said opposite body sides, roof closure panels, and means guiding said closure panels for edgeways sliding generally horizontally away from first positions adjacent to said respective body sides and closing the respective roof openings, covering at least a portion of each of said kitchen and storage compartments, respectively and toward said upright partition into open positions substantially out of vertical overlapping relationship with such first positions, respectively, and uncovering such portions of the kitchen and storage compartments, respectively, covered thereby in their closed positions.

References Cited in the file of this patent

UNITED STATES PATENTS

| 776,623 | Smith | Dec. 6, 1904 |
| 1,113,985 | Greene | Oct. 20, 1914 |
| 1,320,554 | Houser | Nov. 4, 1919 |
| 1,562,371 | Shanks | Nov. 17, 1925 |
| 1,612,839 | Shields | Jan. 4, 1927 |
| 2,499,749 | Hilliard | Mar. 7, 1950 |
| 2,543,349 | Britton | Feb. 27, 1951 |

FOREIGN PATENTS

| 464,547 | France | July 10, 1913 |
| 411,791 | France | Apr. 19, 1910 |
| 718,911 | France | Nov. 13, 1931 |
| 680,405 | Great Britain | Oct. 1, 1952 |